June 22, 1926.

O. E. WINTER

REGULATING COMPASS

Filed May 26, 1922

Inventor:
O. E. Winter
By Marks & Clark
Atty's

June 22, 1926.

O. E. WINTER

REGULATING COMPASS

Filed May 26, 1922

Inventor:
O. E. Winter
By Marks & Clerk
Atty's

Patented June 22, 1926.

1,589,673

UNITED STATES PATENT OFFICE.

OSKAR EDVIN WINTER, OF STOCKHOLM, SWEDEN, ASSIGNOR OF ONE-HALF TO KNUT STEINMETZ, OF LONDON, ENGLAND.

REGULATING COMPASS.

Application filed May 26, 1922, Serial No. 563,831, and in Sweden August 29, 1919.

The invention relates to such compasses which are provided with means for automatically steering ships or registering the course of ships or the like and more particularly to compasses of this kind in which the automatic regulation in question is effected electrically under the control of a number of relays or devices adapted to be operated by radiant energy, for instance photo-electric cells or resistances, which are brought into operation upon a deviation of the compass needle the steering machinery or the registering device respectively being then operated over circuits controlled by said relays.

The present invention contemplates certain improvements in regulator compasses and control systems of the kind referred to which will be more particularly described with reference to the accompanying drawings which illustrate schematically two different applications of the invention.

Figure 1:
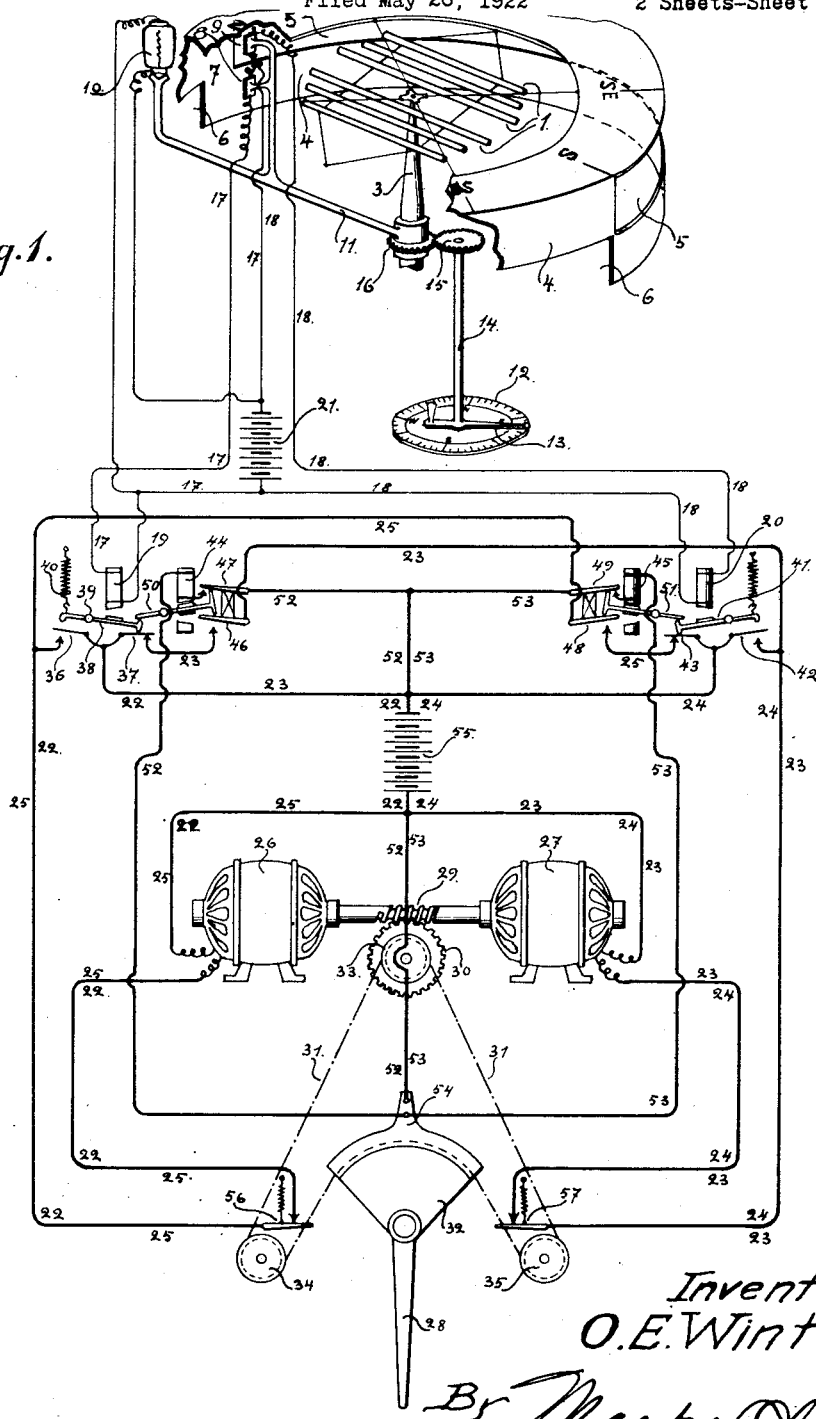
Fig. 1 shows a self-steering system for ships.

Referring to Fig. 1 the numeral 1 designates the compass needle or needle system and 2 the compass card attached thereto in known manner and forming together with the needle system a swingable system carried by the shaft 3 of the compass the latter being mounted in a Cardan frame in the usual way so as to be kept continually in a vertical position. Attached to the compass card 2 is a screen 4 of a substantially cylindrical form extending downwards from the edge of the compass card. Said screen is provided with two openings 5 and 6 extending horizontally to opposite sides from a central unbroken section 7 located opposite to the north-pole of the needle. The openings 5 and 6 are further displaced relatively to one another in a vertical direction so as to register each with one of two electrical relays 8 and 9 mounted one above the other below the compass card and adapted to be operated by radiant energy from a source of radiant energy 10 arranged opposite to the relays on the outer side of the screen 4. In the example shown in the drawing the said relays 8, 9 consist of selenium cells and the source of energy 10 consists of an electric lamp. The relative arrangement of the lamp and the screen is such that in the normal position shown in the drawing the selenium cells are screened off by the section 7, whereas a deviation of the compass needle to one side causes one cell and a deviation to the opposite side the other cell to be exposed to the rays of light from the lamp. The lamp and the selenium cells are mounted in a common support in the form of an arm 11 journalled on the shaft 3 of the compass so that it may be rotated round the axis of the compass for steering purpose. To this end there is provided a fixed compass card 12 and a pointer 13 adapted to be set by hand on said card. The pointer is connected through a shaft 14 and a gear 15, 16 to the hub of the arm 11 in such a manner that a certain adjustment of the pointer causes a corresponding angular displacement of the arm 11.

The selenium cells 8 and 9 are arranged to control two circuits 17 and 18 respectively each including a switching relay 19 and 20 respectively and a feeble current battery 21, common to both circuits, said battery also feeding the lamp 10. Each switching relay is adapted to control two operating circuits 22, 23 and 24, 25 respectively for the steering machinery which in the example shown consists of two electrical motors 26 and 27 operating the rudder 28 by means of a screw gear 29, 30 and a chain 31 fastened to the rudder sector 32 and running over a driving pulley 33 and two guide pulleys 34, 35. The motor 26 is adapted to shift the rudder to starboard and the motor 27 is adapted to shift the rudder to port.

The circuits 22 and 24 are shifting circuits whereby the rudder is shifted to one or the other side upon a deviation from the right course, whereas the circuits 23 and 25 are resetting circuits, whereby the rudder is returned to its normal lengthwise position. The operating circuits 22, 23 include contact springs 36 and 37 respectively arranged to be actuated one by each end of the armature 38 of the switching relay 19, which armature forms a two-armed lever pivoted at 39 and actuated by a spring 40. Similarly the circuits 24 and 25 are controlled by the switching relay 20 by means of its armature 41 and contact springs 42, 43. The resetting circuits 23 and 25 are further controlled by auxiliary relays 44 and 45 respectively which are of the polarized type and adapted to actuate two contact levers 46, 47 and 48, 49 respectively by means of the armatures 50 and 51 respectively. The circuits 52 and 53 of the relays 44, 45 are controlled by the rudder by means of a switch 54 attached to the rudder sector 32 and adapted to connect said circuits to a power current battery 55 when the rudder is in its lengthwise position and to disconnect the circuits, when the rudder is shifted to one or the other side. The rudder also controls the shifting circuits 22 and 24 by means of contact springs 56 and 57 respectively operated to open said circuits in a certain angular position of the rudder.

Supposing the ship changes its course to port, the compass needle thus seemingly deviating to the right, the selenium cell 8 will be uncovered and exposed to the light from the lamp 10 through the opening 6 and, consequently, current will flow through the switching relay 19, which then attracts its armature thereby closing the shifting circuit 22 through the motor 26. The rudder will thus be shifted to starboard. When the ship has resumed its course, the selenium cell 8 is again covered by the section 7 of the screen 4 and, consequently, the switching relay 19 de-energizes and releases its armature thereby opening the circuit 22 and closing the resetting circuit 23 at the contact spring 37, the closure of the latter circuit having been prepared upon the energization of the switching relay 19 by the armature 38 actuating the armature 50 of the auxiliary relay 44 whereby the armature 50 was shifted to its other position in which the contact lever 46 closes the corresponding contact. The rudder is therefore now returned to its normal lengthwise position. When it reaches this position, the circuit 52 of the auxiliary relay 44 is closed by the switch 54, said circuit having been prepared upon the shifting of the armature 50 of the auxiliary relay 44 by the contact lever 47 then closing the corresponding contact. The relay 44, upon energizing, opens the resetting circuit 23 at the contact lever 46, whereby the rudder is stopped in its lengthwise position, and at the same time the circuit 52 of the auxiliary relay 44 is opened at the contact lever 47. Should the rudder reach its outermost position before the ship has resumed the right course, the shifting circuit 22 will be opened in this position by the rudder actuating the contact spring 56. A change of the course to the opposite side will cause a similar control operation by the action of the relays 20 and 45 and the selenium cell 9 which is exposed through the opening 5.

If it is wanted to change the course definitely, the pointer 13 is set on the corresponding quarter of the dial 12. This will cause a corresponding adjustment of the arm 11 and, consequently, a control operation will be started whereby the ship is caused to take up the new course. When the ship enters the new course, the selenium cell in question will be covered by the section 7 of the screen and thus made inoperative and the ship will then be kept in this course by the automatic control described.

Figure 2:
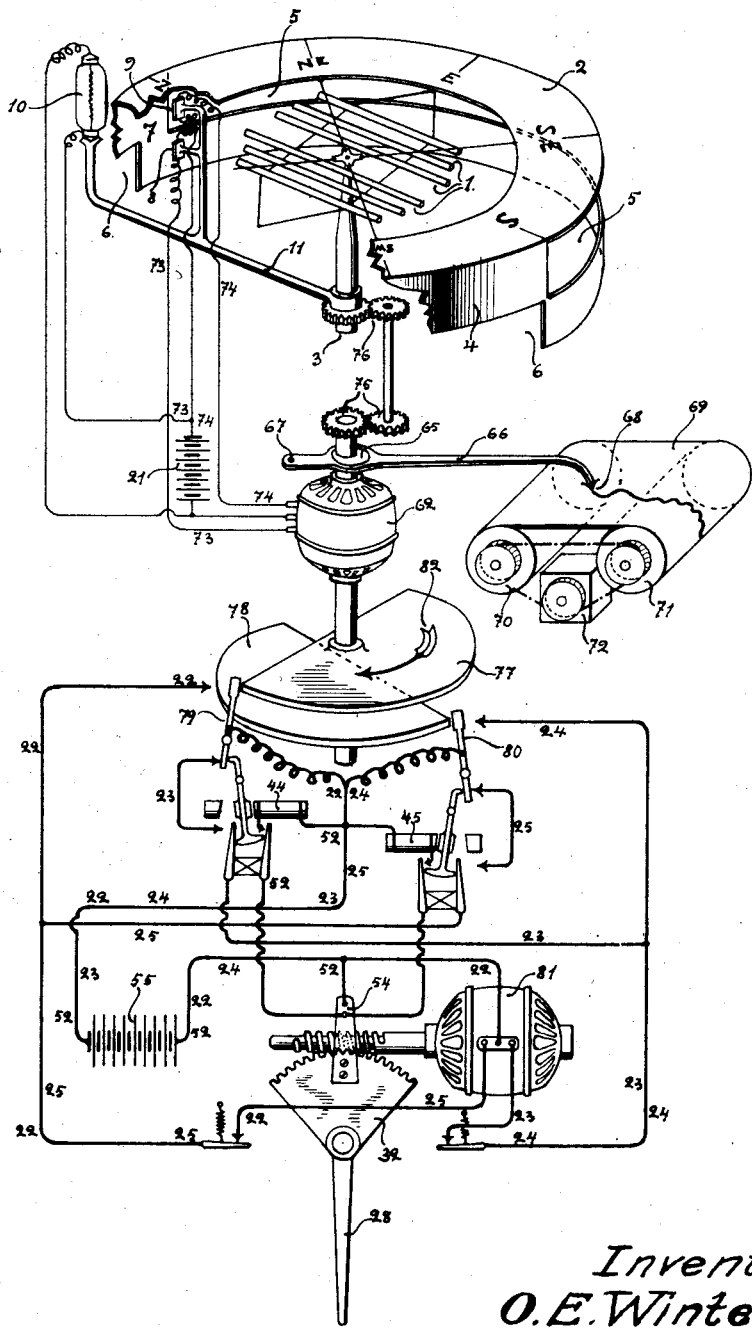
Fig. 2 shows a combined registering and steering mechanism.

In the combined registering and steering system shown in Fig. 2 the compass is constructed in accordance with Fig. 1 the arm 11 being, however, arranged to be turned by an electric motor 62 through gears 75, 76, said motor having two operating circuits 73, 74 which are arranged under the control of the selenium cells 8, 9 in such a manner that the motor will be driven, upon a change of course, in the one or the other direction respectively according as the selenium cell 8 or the cell 9 is exposed. Secured to the shaft of the motor 62 is an eccentric sheave 65 which operates a lever 66 pivoted at 67 and carrying a drawing pin 68 bearing against a diagram paper 69. The latter is wound on a pair of rollers 70, 71 which are driven by a clockwork 72 or the like.

The rudder control circuits are substantially the same as in Fig. 1 but the control of the rudder motor circuits is here effected mechanically from the shaft of the motor 62 by means of two segments 77, 78 fixed to the shaft and two two-armed contact levers 79, 80 co-operating with said segments. The levers 79, 80 are arranged to operate in exactly the same manner as the armatures 38, 39 of the switching relays 19, 20 in Fig. 1. Thus, each lever 79 and 80 controls two operating circuits 22, 23 and 24, 25 respectively by means of auxiliary polarized relays 44, 45. The rudder is here operated by a single motor 81, adapted to run in opposite directions, instead of by two motors, as in Fig. 1.

For the purpose of explanation it may be assumed that the ship deviates for one reason or other to port from the course determined by the position of the arm 11 relatively to the compass needle when all parts are in the positions shown in the drawing. The selenium cell 8 will then be exposed and will cause the shaft of the motor 62 to be rotated in the direction of the arrow 82 whereby the arm 11 is turned in the same direction till the selenium cell 8 is screened off, when the flow of current ceases and the motor is stopped. By this movement of the motor the contact lever 79 has been operated by the segment 77 so as to close the circuit 22 whereby the rudder is shifted to starboard. The ship will thus be brought back into its original course. This change of course, on the other hand, will cause the selenium cell 9 to be exposed whereby the motor 62 is rotated in the opposite direction. This rotation will obviously continue till the arm 11 and the segments 77, 78 have resumed their normal angular positions what occurs when the ship has resumed its original direction of course. In the normal position of the segment 77 the contact lever 79 is released and the circuit 22 is opened. At the same time the resetting circuit 24 is closed and the rudder is returned to its normal position in which the circuit of the auxiliary relay 44 is closed and the resetting circuit opened as previously explained in connection with Fig. 1. If the selenium cell 9 should be screened off by the rotation of the motor 62 and the arm 11, before the ship has resumed its course, the contact lever will remain operated by the segment 77 and, consequently, the rudder is still shifted to starboard and by the continued change of course the selenium cell 9 will again be exposed so as to cause a further rotation of the motor 62 back to the original position. It is seen that every deviation from the course will cause the arm 11 and the screen 4 to make a corresponding angular displacement, the screen 4 always tending to resume its original position relatively to the compass needle. It is also evident that by the movements of the shaft 61 the drawing pen will draw a curve on the continually moving paper 68 which curve will represent the variations of the course. For the purpose of facilitating an exact reading of the deviations on the paper the latter may be provided with a transversal scale, and for reading the time a longitudinal scale may be provided. In the system according to Fig. 2 a definite change of course can, evidently, be brought about by displacing the segments 77, 78 angularly as a whole relatively to the shaft of the motor 62. To this end the segments may, for instance be pivotally mounted on the shaft in such a manner that a certain effort is required to overcoming the friction between the segments and the shaft. If the course is to be changed for instance to port, the segments are to be displaced for a corresponding angle in the direction of the arrow 82.

The above described regulator compass may be employed also for surveying and mapping purpose, for instance for exact drawing of boundaries, roads, coast lines and river courses, and under special conditions it may be used for indicating distances covered, and so on.

What I claim is:

1. A regulator compass comprising a swingable compass housing, a source of radiant energy mounted therein, two control relays responsive to radiant energy from said source, a compass card, a screen movable with the compass card and adapted to cover normally both relays and to uncover one relay upon a deviation in one direction and the other relay upon a deviation in the opposite direction, an adjustable support for said relays mounted within the compass housing and rotatable about the axis of the compass, a stationary operating device outside the compass housing for rotating said support, and a shaft connecting said operating device with said support.

2. A regulator compass comprising a swingable compass housing, a source of radiant energy mounted therein, two control relays responsive to radiant energy from said source, a compass card, a screen movable with the compass card and adapted to cover normally both relays and to uncover one relay upon a deviation in one direction and the other relay upon a deviation in the opposite direction, an adjustable support for said relays mounted within the compass housing and rotatable about the axis of the compass and means for rotating said support comprising a stationary electrical motor placed outside the compass housing and a shaft connecting said motor with said support.

3. A regulator compass comprising a swingable compass housing, a source of radiant energy mounted therein, two control relays responsive to radiant energy from said source, a compass card, a screen movable with the compass card and adapted to cover normally both relays and to uncover one relay upon a deviation in one direction and the other relay upon a deviation in the opposite direction, an adjustable support for said relays mounted within the compass housing and rotatable about the axis of the compass, a stationary operating device for said support placed outside the compass housing, a shaft connecting said operating device with said support and a gearing inserted between the shaft and the support.

4. A regulator compass comprising a swingable compass housing, a source of radiant energy mounted therein, two control relays responsive to radiant energy from said source, a compass card, a substantially cylindrical screen attached to and placed below the compass card and adapted to cover normally both relays and to uncover one relay upon a deviation in one direction and the other relay upon a deviation in the opposite direction, an adjustable support for said relays mounted within the compass housing below the compass card and rotatable about the axis of the compass, a stationary electrical motor for rotating said support arranged outside the compass housing, a shaft connecting said motor with said support, and a gearing inserted betweeen the shaft and the support.

In testimony whereof I affix my signature.

OSKAR EDVIN WINTER.